United States Patent [19]

Stemmle

[11] Patent Number: 4,727,397

[45] Date of Patent: Feb. 23, 1988

[54] BOOK STYLE DUPLEX COPYING FOR SHORT EDGE FEED SHEETS

[75] Inventor: Denis J. Stemmle, Webster, N.Y.

[73] Assignee: Xerox Corporation, Stamford, Conn.

[21] Appl. No.: 51,789

[22] Filed: May 20, 1987

[51] Int. Cl.[4] ........................ G03B 27/32; G03B 27/52

[52] U.S. Cl. ........................................ 355/24; 271/186

[58] Field of Search ................................ 271/184–186; 355/24, 3 SH, 14 SH, 72, 77

[56] References Cited

U.S. PATENT DOCUMENTS

| | | | |
|---|---|---|---|
| 4,050,805 | 9/1977 | Hage | 355/14 |
| 4,387,890 | 6/1983 | Lampe | 271/184 |
| 4,602,775 | 7/1986 | Calhoun et al. | 271/186 |

OTHER PUBLICATIONS

R. E. Shaeffer, "Copy Rotator/Inverter" Xerox Disclosure Journal, vol. 9, No. 5, Sep./Oct. 1984, pp. 323–324.

*Primary Examiner*—Richard A. Wintercorn
*Attorney, Agent, or Firm*—Mark Costello

[57] ABSTRACT

A method and apparatus is provided for making book style duplex copies from simplex originals with images having a top to bottom alignment oriented in the direction of sheet travel. Copy sheets bearing first side images are passed along a duplex path and stacked in a duplex tray. Prior to refeeding, the tray is rotated by 180° in a single plane whereby the leading edge of said sheets becomes the trailing edge of the sheets upon being fed out form the duplex tray. The arrangement provides selectable pad style or book style copying. Sheets rotated in a side registered machine may be offset to provide correct registration with rotation.

12 Claims, 7 Drawing Figures

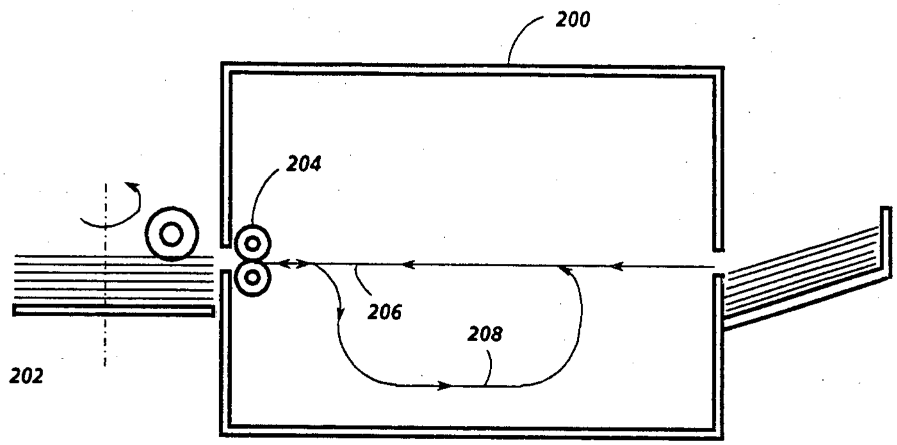
FIG. 6
FIG. 7
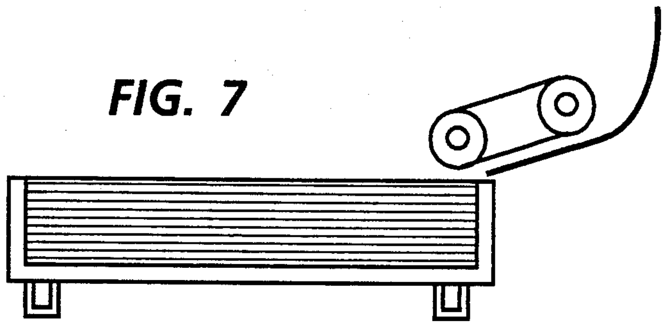

BOOK STYLE DUPLEX COPYING FOR SHORT EDGE FEED SHEETS

This invention relates generally to copy sheet handling and duplex copying operations, and more specifically to an arrangement providing operator choice of pad style or book style duplex copying.

INCORPORATION BY REFERENCE

U.S. patent application Ser. No. 814,827, filed Dec. 30, 1985, and assigned to the same assignee as the present application, is incorporated by reference herein.

BACKGROUND OF THE INVENTION

Duplex copying, i.e., copying image information to both sides of a single sheet of paper, is an important feature in copying machines. Duplex copying is desirable because it reduces the amount of paper required in copying in comparison to simplex (single side) copying, produces attractive copy sets, and can simulate the appearance of a printed book. Generally, such copying is accomplished in either one of two methods. In a first method, first side copies are produced in a reproduction processor and stacked in a duplex tray. When a set of first side copies is complete, the copies are fed out of the duplex tray and returned to the reproduction processor with an odd number of inversions in the total duplex path to receive second side image information, and subsequently passed to an output. Alternatively, first side copies may each be returned directly to the reproduction processor to receive second side copies thereon, without stacking, for example, as described in U.S. patent application Ser. No. 814,827. This type of copying finds particular use with respect to copying two documents placed on a platen for sequential copying, sometimes referred to as two-up copying.

Book style duplex copying, as used herein and with reference to FIG. 1 (*a*) refers to the production of duplex copy sets which are suitable for reading as a book, from top to bottom from the same sheet edge, with the image top portion on both sides of the sheet adjacent the top edge of the sheet, for binding along a side edge with respect to the image. This appearance is generally only achieved in present duplex-capable reproduction machines, however, when copy sheets are fed through the reproduction processor to receive image information on one or both sides of the copy sheet with the image top to bottom alignment or orientation, as the image is normally viewed, oriented on the sheet transverse to the direction of sheet feeding. When duplex copies are made with image top to bottom alignment oriented on the sheet in the direction of sheet travel in the same reproduction machines, the resulting two-sided copies do not have the top portions of the image along a common edge of the sheet. Instead, the image top portions are adjacent opposed edges on each side of the sheet, which, when the copy set is bound along a side edge in a book style format, provides the second sides of the sheets upside down with respect to the first sides of the sheets. This type of copying, illustrated at FIG. 1(*b*), sometimes called military style duplex, and hereinafter referred to as pad style duplex, provides easy viewing only if the copy set is bound along the top edge and read by turning pages upwardly to read the back side of each sheet. While pad style duplex copying has certain applications, it is frequently undesirable in duplex copying usage.

Heretofore, in duplex capable copying machines where it has been desirable to provide book style duplex copying from simplex originals, it has been necessary for the machine to provide a paper path and processor accommodating LEF (long edge first) sheets and place images on the sheet having a top to bottom alignment oriented transverse to the direction of sheet travel. This arrangement adds significantly to the cost of the machine, as it requires paper path and processing elements to accommodate the long edge of sheets fed through the machine. In very low cost machines, it is desirable to provide only a narrow processor, accommodating for example, $8\frac{1}{2}\times 11$ inch sheets fed SEF (short edge first). The width of the paper path and processing elements in such a machine are only required to accommodate the $8\frac{1}{2}$ inch length of the sheet, as opposed to machines required to accommodate at least 11 inch widths to accommodate the long edge of a $8\frac{1}{2}\times 11$ inch sheets. However, this arrangement ordinarily precludes the desirable book style duplex from simplex documents, as the bulk of simplex documents copied have images oriented with the image top portion adjacent a short edge of the document sheet. Alternatively, an operator desiring to produce duplex copies from simplex documents on SEF sheets, must manually rotate every other document to be copied by 180° prior to copying. This is inconvenient, and potentially confusing, allowing the possibility of operator errors. Additionally, such an arrangement precludes the simple use of automatic document feeders to feed the set of documents to be copied past the platen, as an operator seeking to take advantage of the increased speed in automatic document handling must manually prepare the set of simplex documents to be copied with every other sheet rotated with respect to the previous sheet, and re-order the document set subsequent to copying. Of course, this is not merely a problem of small copiers, since this characteristic is present in all copiers where SEF and duplex copying from simplex originals are provided. For example, for copiers with an 11 inch wide paper path, for simplex to duplex copying, $8\frac{1}{2}\times 11$ inch copies are produced book style, because the sheets are fed LEF, but legal size copies $8\frac{1}{2}\times 14$ inch) are fed SEF, and so produce pad style duplex copies. Large copies, such as $11\times 17$ inch sheets are commonly fed with the short edge first, and depending on image orientation, also experience the problem. Likewise, for ledger or landscape format copies where images are arranged to have a top to bottom alignment with the top portion of the image adjacent a long edge of the sheet, feeding the sheets LEF, with the image alignment transverse to the direction of sheet feeding, results in pad style duplex copies.

If the copy sheets could be rotated, i.e., the lead edge of the sheet could be converted to the trail edge of the sheet, while maintaining the first side image in the same plane, in addition to the normal duplex inversion, book style copying could be accommodated in sheets having images oriented transverse to the direction of sheet travel. Arrangements for rotation of sheets themselves are known, such as, for example, Xerox Disclosure Journal, Copy Rotator/Inverter, Vol. 9, No. 5, Sept./Oct., 1984, pp. 323–324, by R. E. Shaeffer, which discloses apparatus to rotate a sheet along a paper path by 180° in order to provide correct duplex style copying. Such arrangements are problematic since they require handling each sheet in a copy set, increasing the probability of a jam, damage to the copy, misregistration, etc. Additionally, such an arrangement requires a long flat paper path, which may not be available in a small or compactly arranged copier.

SUMMARY OF THE INVENTION

In accordance with the invention there is provided a method and apparatus for book style duplex copying for duplex copies made from simplex originals with images having a top to bottom alignment oriented in the direction of sheet travel.

In accordance with another aspect of the invention, a method of providing selectable book style or pad style duplex copying from simplex originals in an imaging device suitable for duplex copying includes the steps of making at least one first side copy in a reproduction processor, moving the copy to a duplex tray, rotating the duplex tray 180° and feeding the copy out from the duplex tray back to the reproduction processor with a total odd number of inversions in the duplex path to receive a second side copy. An alternative method of accomplishing the same result provides for a first 180° rotation of the duplex tray, prior to depositing first side copies therein, and a second 180° rotation of the duplex tray upon completion of the first side copy set to make the appropriate edge of the copy sheets available for feeding from the duplex tray.

In accordance with another aspect of the invention, selectable book style and pad style duplex copying are provided in an imaging device suitable for duplex copying, including a reproduction processor and a duplex path for carrying sheets bearing a first side image from the reproduction processor through the duplex tray back to the reproduction processor with a total odd number of inversions in the duplex path to receive a second side image. The duplex tray allows sheet feeding from the tray in both its normal condition and after rotation by 180°. When normal duplex copying will result in undesired pad style duplex copy sets, the duplex tray, and accordingly the copy set bearing first side images supported therein, is rotated 180° in a single plane, whereby the edge of the copy sheets that would normally constitute the trailing edge thereof is converted into the lead edge and and the copy sheets bearing first side images are returned to reproduction processor in a manner which will result in the top portions of the images on either side of the copy sheet being placed on their respective sides of the sheet adjacent a common edge of the sheet. The tray may be operator removable from its position with respect to the copy sheet tray, and reinsertable into position in rotated condition, allowing the sheets to be fed out from the tray in either condition. Alternatively, a rotating tray support may be provided, and the tray rotated in its position through 180° of rotation.

When referring to tray rotation herein, what is referred to is the rotation of the duplex tray in 180° increments, while maintaining the tray in a single plane with respect to the paper path. Accordingly, while U.S. Pat. No. 4,050,805 to Hage describes "tray rotation", the duplex tray is not maintained in a single plane with respect to the paper path, but rather is pivotally moved out of its position with respect to the duplex path to a second position where the copy sheet feeding mechanism may be used to feed sheets out from the duplex tray.

In accordance with another aspect of the invention, multiple sizes of side registered sheets may be supported in a duplex tray adapted for rotating movement to provide selectable book style and pad style duplex copying.

The center of rotation of the duplex tray is varied in accordance with paper size to bring the copy sheets in the duplex tray to a side registered position irrespective of tray rotation.

These and other aspects of the invention will become apparent from the following description used to illustrate a preferred embodiment of the invention read in conjunction with the accompanying drawings in which:

FIGS. 1(*a*) and (*b*) show the differfence between book style and pad style duplex copies;

Figure 1:
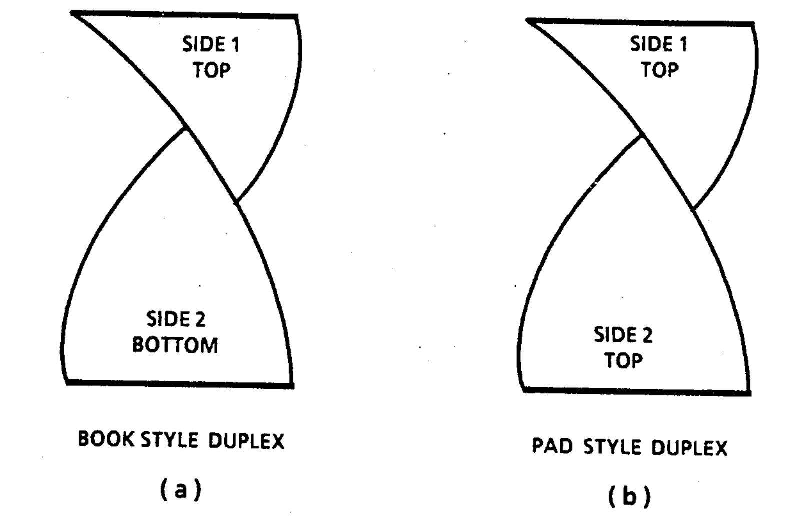
Figure 5:
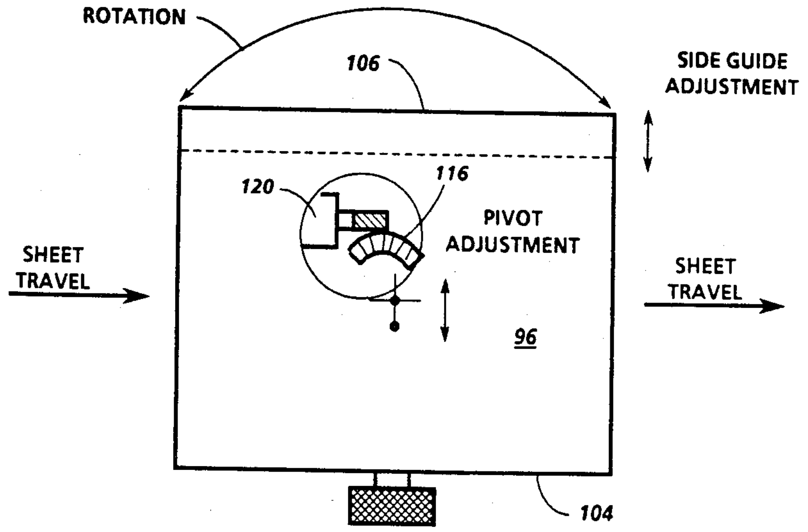

FIG. 5 schematically shows a plan view of a tray and its rotation to accommodate pad style and book style duplex copying, including a cutaway portion to show operative elements for tray rotation;

FIG. 6 shows a schematic view of another paper path configuration suitable for use with the present invention; and FIG. 7 schematically shows a duplex tray manually removable from a reproduction machine for selectable book style and pad style duplex copying.

Figure 2:
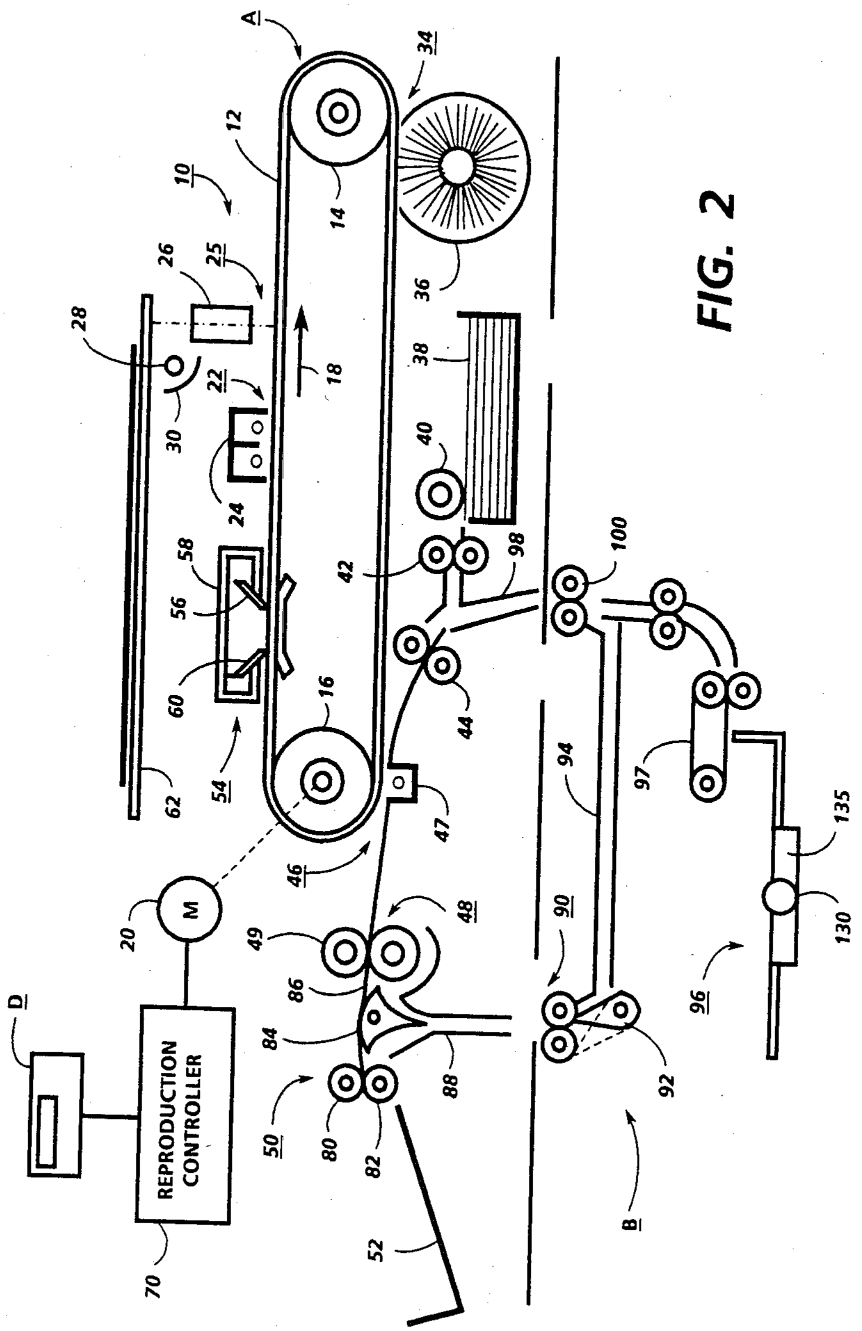
FIG. 2 is a side view of of the operational aspects and paper paths of a reproduction machine of the type contemplated to incorporate the present invention.

Referring now to the drawings where the showings are for the purpose of describing a preferred embodiment of the invention and not for the purpose of limiting same, FIG. 2 shows a reproduction machine having the capability of two side, or duplex copying from simplex documents in accordance with the invention, and including a somewhat schematic view of a copy sheet path as it carries paper through the processing stations of a reproduction machine and the inventive duplex arrangement for selective book style or pad style duplex copying.

The reproduction processor A illustrated in FIG. 2 employs a belt-like photoreceptor member 10, the outer surface 12 of which is coated with a suitable photoconductive material for electrophographic copying. The belt is suitably mounted for revolution within the processor about driven transport rolls 14 and 16, and travels in the direction indicated by the arrows numbered 18 on the inner run of the belt to bring the photoreceptor surface 12 thereon past a plurality of conventional xerographic processing stations. Suitable drive means such as motor 20 are provided to power and coordinate the motion of the various cooperating machine components whereby a faithful reproduction of the original input image information is recorded upon a copy sheet, such as a paper or the like.

Initially, photoreceptor 10 is passed through a charging station 22 wherein photoreceptor surface 12 is uniformly charged with an electrostatic charge placed on the photoreceptor surface by charge corotron 24 in a known manner preparatory to imaging. Thereafter, at exposure station 25, photoreceptor surface 12 is exposed to light reflected from a document placed on platen whereby the charge placed on photoreceptor surface is selectively dissipated in the exposed regions to record the document image in the form of electrostatic latent image. The exposure station 25 may comprise a bundle of image transmitting fiber lenses 26 produced under the tradename of "SELFOC" by Nippon Sheet Glass Company Limited, together with an illuminating lamp 28 and a reflector 30 which illuminate and direct light from the document to the photoreceptor surface.

Subsequent to the creation of the latent image, photoreceptor surface 12 is moved through development station 34. A suitable development station could include a magnetic brush development system, including developer roll 36, utilizing a magnetizable developer mix having coarse magnetic carrier granules and toner colorant particles. The operator may be provided with means to select among a choice of colored toners to apply images onto copy sheets in different colors.

Blank copy sheets are supported in a stacked arrangement on blank copy sheet stack support tray 38. Sheet separator segmented feed roll 40 feeds individual copy sheets therefrom through pinch roll nip 42 to the registration pinch roll nip 44. The copy sheets are forwarded to a transfer station 46 in proper registration with the image on photoreceptor surface 12. The developed toner image on photoreceptor surface 12 is brought into contact with the copy sheet within transfer station 46. The toner image is transferred from photoreceptor surface 12 to the contacting side of the copy sheet by means of transfer corotron 47. Following transfer of the image, the copy sheet is separated from photoreceptor surface 12 by the beam strength of copy sheet as it passes around the curved face of photoreceptor member 10 around the transport roller 16. The copy sheet supporting the toner image thereon is advanced through fusing station 48 wherein the toner image is permanently affixed to the copy sheet at heat and pressure roll nip 49. After fusing, the copy sheet is advanced to a reversible exit nip 50 where the sheet may be directed to an output such as sheet stacking tray 52 or a sorter, or directed to the duplex portion of the machine, such as duplex module B. Reversible exit nip 50 is controllably driven in forward, reverse, or stop motion to selectably direct copy sheets in the direction required by the machine operation.

Although a preponderance of toner on photoreceptor surface 12 is transferred to the copy sheet, invariably some residual toner remains on the photoreceptor surface after the transfer of the toner image to the copy sheet. Residual toner particles are removed from photoreceptor surface 12 at cleaning station 54 which comprises a cleaning blade 56 in scraping contact with photoreceptor surface 12, and contained within cleaning housing 58 which has a cleaning seal 60 associated with the upstream opening of the cleaning housing. Alternatively, the toner particles may be mechanically cleaned from the photoconductive surface by a cleaning brush as is well known in the art.

When the copier is operated in the conventional mode, an original document to be reproduced is placed on platen 62 which is scanned past exposure station 25 for the creation of a latent image on the photoreceptor surface. Movement of photoreceptor 10 and platen 62 are synchronized to provide for accurate reproduction of the document. Alternatively, a multi-mirror scanning optics arrangement may be substituted for the fiber optic lens, in which a mirror arrangement is scanned past a stationary document, to direct light from a document to photoreceptor surface 12. An automatic document feeder (not shown) may be provided to feed documents into position on the platen 62. A similar function is also accomplished by an electronic printer employing a laser driven in accordance with an electronic image stored in memory to selectively dissipate charge from the photoreceptor surface.

Reproduction machine controller 70 is preferably a known programmable controller or combination of controllers, which conventionally controls all of the machine steps and functions described herein and including the operation of the paper path drives in both the reproduction processor A and duplex module B. As further described herein, controller 70 also conventionally provides for storage and comparisons of counted values including copy sheets and documents, and numbers of desired copies, and control and execution of operations selected by an operator through operator display and control D. Controller 70 may be responsive to a variety of sensing devices such as paper size sensors, edge sensors, etc, to further enhance its control of the reproduction machine.

In operation, reversible exit nip 50 receives copy sheets between rollers 80 and 82 from fuser station 48. For duplex copying, the copy sheet is passed thereinbetween until the trailing edge clears deflector 84 in the copy sheet path 86 from fuser station 48 to the exit nip 50. When the sheet has cleared deflector 84, rollers 80 and 82 change driving direction to direct the sheet into duplex module copy sheet path 88, whereby the trailing edge of the copy sheet is changed to the leading edge, for the normal sheet reversal or lead edge to trail edge inversion for standard duplex copying, which provides the duplex paper path with an odd number of inversions. Deflector 84 is situated slightly higher than the reversible exit nip, and extends into the paper path 86 to direct returning copy sheets into duplex path 88. In some embodiments, the deflector 84 may be movable to block sheet access to the reversible exit nip and direct sheets to duplex path 88, in order to allow sheets to be returned to the reproduction processor without reversal and with two natural inversions, to return the sheet with the same side available for color or image overlay copying. However, for the purpose of describing selectable pad style or book style duplex copying, it will be assumed that the sheets are always passed through the reversible exit nip for lead edge to trail edge inversion.

Copy sheets are passed from reversible exit nip 50 past deflector 84 via duplex paper path 88 to duplex module entry nip 90 into the duplex module B. On passing duplex module entry nip 90, duplex deflector baffle 92 serves to direct copy sheets to either trayless path 94 or duplex tray 96. When duplex deflector baffle 92 is in place to block entry of copy sheets into the trayless path 94, copy sheets are directed into duplex tray 96. Copy sheets passed to duplex tray 96 are refed therefrom with sheet feeder 97 to reproduction processor duplex entry path 98 through duplex module exit nip 100, with a natural single inversion to re-enter the reproduction processor module A for receiving a second side copy. The operation of the trayless path is described in U.S. patent application Ser. No. 814,827, incorporated by reference herein. It will no doubt be appreciated that the sheets must be subject to a total odd number of inversions while in the duplex path in order to present the unimaged side of the sheets to the transfer station in the processor.

Sheets are deposited in the duplex tray in the described embodiment image side up, with the edge that was the lead edge of the sheet as the sheet left the transfer station now being the trailing edge. If the image top to bottom alignment is oriented along the path of travel of the sheet, i.e., the top portion of the image as it is normally read is along either the leading or trailing edge of the sheet, the duplexed copy will be a pad style duplex copy, unless the document on the platen to be copied to the second side of the copy sheet is arranged for copying rotated with respect to the first side document, or the copy sheet is rotated.

Figure 3:
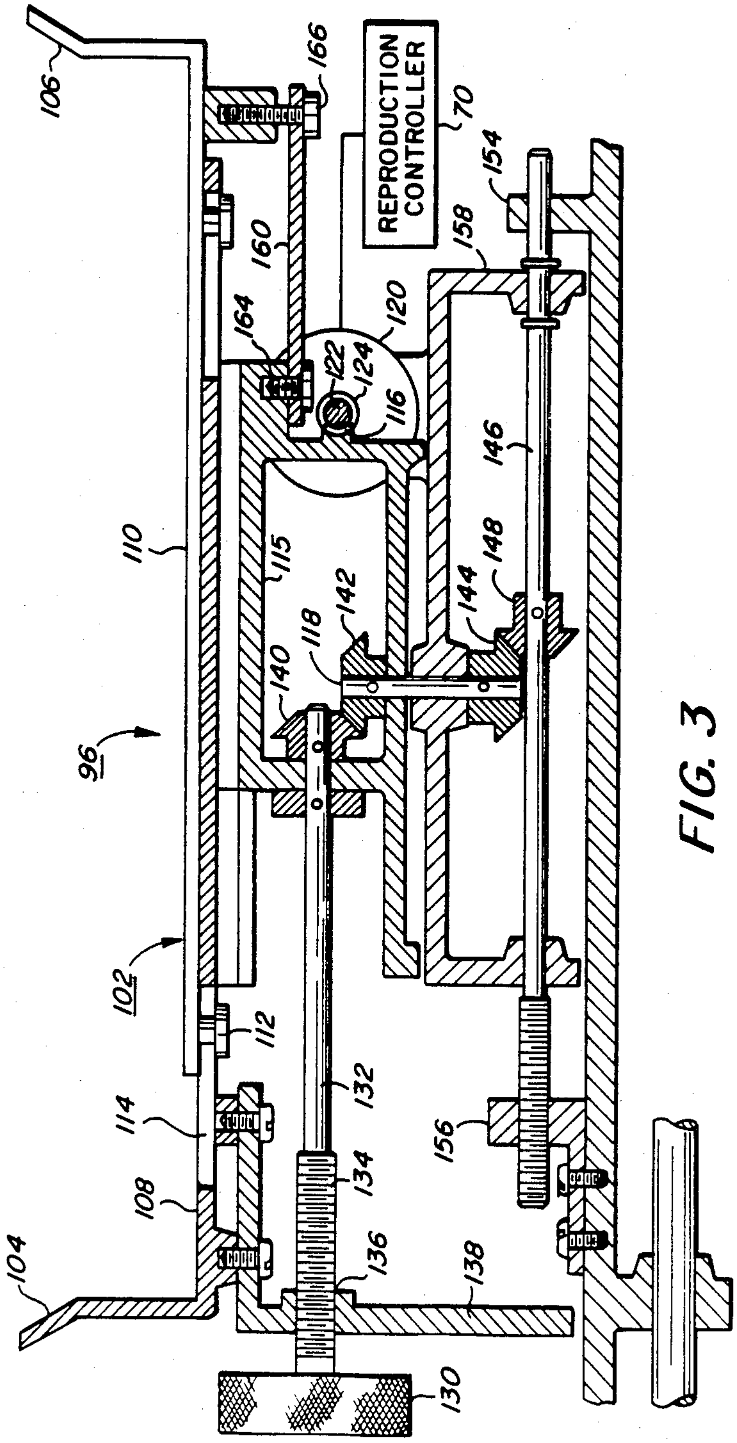
FIG. 3 shows a cross section of a duplex tray, transverse to the direction of paper travel, supported for rotation in accordance with the invention.
Figure 4:
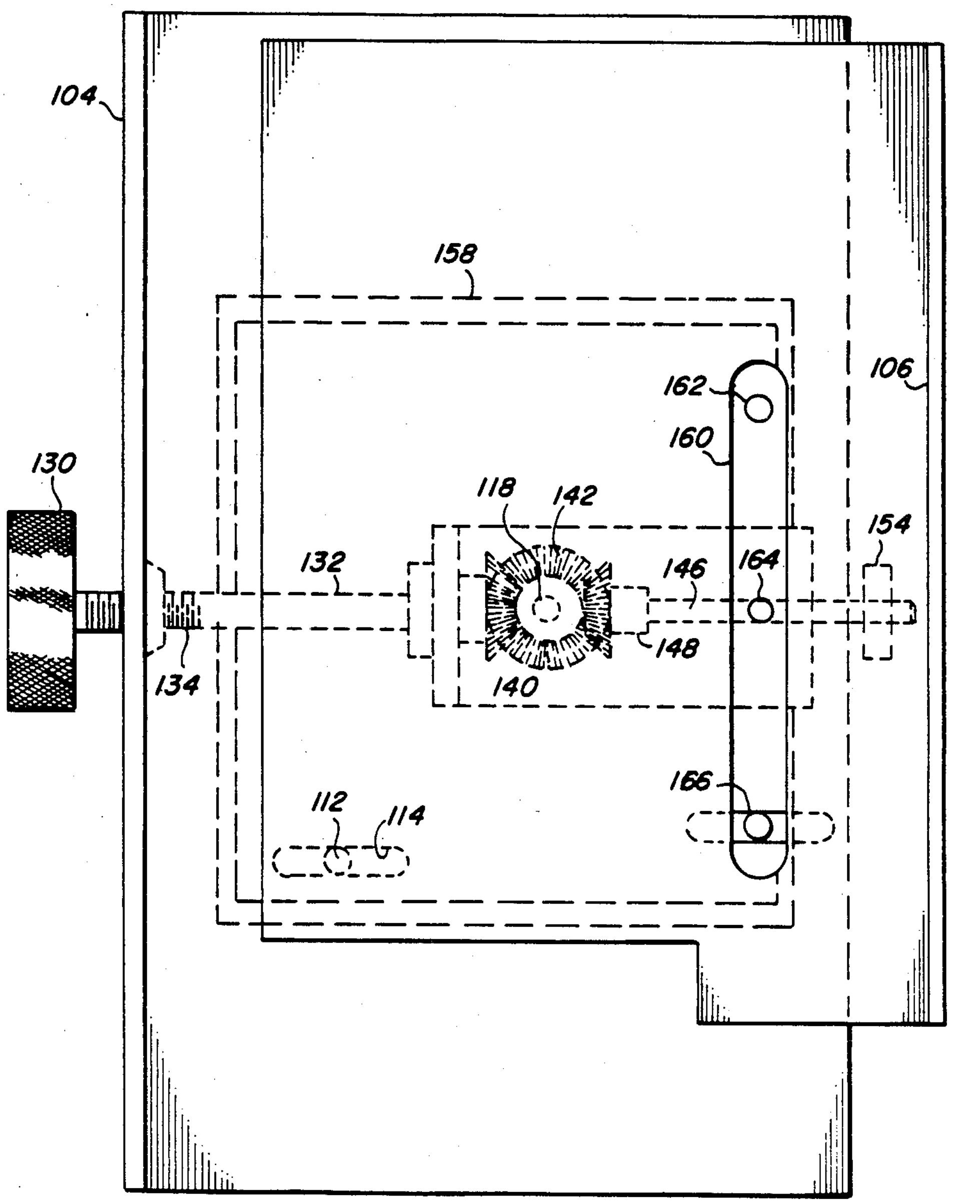
FIG. 4 shows a plan view of the duplex tray supported for rotation in accordance with the invention.

With reference now to FIGS. 3, 4 and 5 and in accordance with the invention, an arrangement for rotation of the copy set deposited in the duplex tray is provided. With particular reference to FIG. 3, duplex tray 96 generally includes tray elevators (not shown) at either end of the duplex tray for raising a stack of sheets into operative engagement with a sheet feeder supported adjacent or on tray elevator platform 102. Tray elevator platform 102 includes front and rear side guides 104 and 106, parallel to the path of paper travel to aid in side-to-side registration of sheets deposited into the duplex tray. Front and rear side guides 104 and 106 are respectively supported on front and rear tray platform halves 108 and 110, which are slidingly interlocked with a pin and slot arrangement, such as pin 112 and slot 114. In the particular embodiment shown, tray platform half 110 is arranged to slide over tray platform half 108.

Tray elevator platform 102 is supported for rotating movement on pivot carriage 115. A semi-circular worm gear 116 may be fashioned as an integral part of pivot carriage 115, arranged with the gear circumference parallel to the plane of the tray platform, and rotating about an axis formed by pivot member 118. Semi-circular worm gear 116 typically will have teeth over a 180° arc. A motor 120, with a shaft 122 supporting a complementary linear worm gear 124 is arranged to support linear worm gear 124 in driving engagement with semi-circular worm gear 116. The motor may be controlled by reproduction machine controller 70, in accordance with operator selection of pad style or book style duplex copying. As the motor is operated, rotating linear worm gear 124 drives the semi-circular worm gear 116 in a rotating motion through the range of the arc of movement to rotate the tray 180°. The motor is reversed to return the tray to its original position along the same path of motion.

In operation of a preferred embodiment, when book style duplex copying is selected for sheets having images with a top to bottom alignment on the sheet oriented in the direction of sheet travel, sheets bearing first side images are directed to duplex tray 96 from duplex paper path 88 by duplex deflector baffle 92. Sheets are stacked in the duplex tray, as in normal duplex copying. If pad style copying is desirable or acceptable, the stacked sheets are fed out from duplex tray through duplex module exit nip 100 to reproduction processor entry path 98 without any change from normal operation. If, however, book style duplex copying is desired in response to operator selection of book style duplex copying at display and control D and on completion of the copy set of sheets having first side images, reproduction machine processor 70 controls motor 120 to rotate linear worm gear 124, and thus, semi-circular worm gear 116. Duplex tray 96 rotates 180° to provide the opposite end of the tray in position for sheet feeder 97 to remove sheets from the tray to be returned to the reproduction processor for second side copying. The sheets in the tray remain image side up, and the edge of the sheets that was the lead edge as the sheets left the transfer station is again the lead edge of the sheet. After the copy sheet set has been fed out of the tray, the reproduction processor signals the motor to return the tray to its original position. In the described embodiment, and as shown in FIG. 5, duplex tray 96 is rotated from its original position by 180° in the clockwise direction, and returned to its original position along the same path. The use of the same path rather than completing 360° of rotation saves space, although it is well within the scope of the invention to return the tray to its original position through complete rotation. Alternately, it is well within the scope of the invention to rotate tray 96 first, prior to receiving sheets bearing first side images thereon, and then rotating the tray again prior to feeding. This alternative embodiment allows the use of only a single tray elevator at one end of duplex tray 96. A variety of control arrangements are also possible, whereby the controller may automatically drive the rotating tray in accordance with detected conditions, such as the selection of simplex to duplex copying for SEF sheets, or operator input of image orientation information.

With reference to FIGS. 3 and 4, sheets registered against front side guide 104 may be displaced from proper registration with respect to the reproduction machine paper paths subsequent to rotation of duplex tray 96, as, upon rotation, the trailing rear edge of the sheets is converted to the leading front edge. In accordance with another aspect of the invention, the position of pivot member 118 is shifted to a position halfway between the front and rear side guide, so that, upon rotation, the copy sheets remain in a constant position relative to the paper path. A manual adjustment of the sheet size to be accommodated in duplex tray 96 may be provided to the operator with adjustment knob 130. Adjustment knob 130 is supported at one end of adjustment shaft 132, which rotates with rotation of knob 130. Adjustment shaft 132 is provided with a screw threaded portion 134 near the knob supporting end of the shaft, which threading engages with a screw opening 136 in front plate 138, which is fixed with respect to the front tray platform half 108. Base 139 is a support platform for the described duplex arrangement which is fixed in position relative to the machine. The other end of adjustment shaft 132, whose axial motion is inhibited relative to pivot carriage 115, supports an adjustment gear 140 in driving engagement with an upper pivot gear 142 on the upper end of pivot member 118, such that movement of adjustment shaft 132 towards and away from the rear edge of the tray drives both pivot carriage 115 and pivot member 118 accordingly. Thus, pivot carriage 115 and rear tray platform half 110 will move with translational movement of the pivot member 118 and adjustment shaft 132. Rotation of adjustment knob 130 is transmitted to rotate pivot member 118. A lower pivot gear 144, supported on the distal end of pivot member 118 from the upper pivot gear, rotates in accordance with upper pivot gear 142, and is drivingly engaged to a tray adjustment shaft 146 via tray adjustment gear 148. Tray adjustment shaft 146 is supported for rotating movement by its driving engagement with lower pivot gear 144 via tray adjustment gear 148. One end of tray adjustment shaft 146 is journaled to the base 139 with base bracket 154 for free rotational and axial movement. The other end of tray adjustment shaft 146 is threadingly engaged to threaded base bracket 156 on base 139. Tray adjustment shaft 146 moves in accordance with movement of adjustment shaft 132 either towards or away from from front plate 136. Tray adjustment gear 148 and lower pivot gear 144 are supported within a motor support platform 158, the upper surface of which supports pivot carriage 115 vertically with respect to the duplex tray, and motor 120. Motor support platform 158 is vertically supported with respect to the duplex tray on base 139, and is axially restrained with respect to tray adjustment shaft 146, such that for translational movement of tray adjustment shaft 146, the motor support platform 158 moves accordingly. Thus, motor 120 is supported in operational relationship with worm gear 116 during the tray adjusting movement. Accordingly, operator rotation of adjustment knob 136 causes translational movement of the pivot member 118, pivot carriage 115, and motor support platform 158 in a direction towards or away from front side guide 104.

Rear tray platform half 110 is engaged to the front tray platform half to allow adjustment of the rear tray platform half with respect thereto. A linkage 160, shown rotated 90° in FIG. 3 and unrotated in FIG. 4, connects the two tray platform halves, fastened with a front pin 162 in the front tray platform half 108, a slide pin 164 on pivot carriage 115 and a rear pin 166 fastening the linkage to the rear tray platform half. The linkage connection of the slide carriage 115 is arranged so that simultaneously with the movement of pivot carriage 115 on turning knob 130, the rear tray platform moves twice the distance that the pivot moves. Thus, the pivot member 118 is maintained along the centerline of the sheets between edge guides 104 and 106.

In operation, the adjustment of duplex tray 96 to accommodate registration requirements begins with the operator adjustment of the knob to bring the size of the duplex tray to the size of sheets to be duplexed. As the knob is turned, pivot member 118, the pivot carriage 115, and the motor support platform 158 are driven either closer to or further from the front side guide, in accordance with the sheet width. The movement of the pivot results in a movement of the rear tray guide in the same direction by a distance twice as great. When book style duplex copying is desired and selected at the display D, for simplex to duplex copying of documents having images with a top to bottom alignment oriented in the direction of sheet feeding, the sheets bearing first side images are fed into the duplex tray. When the first side copy sheet set is complete, the tray is rotated. Rotation is along the centerline of the sheet path, so that no side to side movement of the sheets occurs with respect to the sheet path as consequence of rotation. It will no doubt be appreciated from this description, that knob 130 could be replaced by a motor drive arrangement such that size adjustment could be accomplished automatically by controller 70 once the size of the duplex sheets is known to the controller.

In a center registered reproduction machine, or for a system where only a single width of copy sheets may be duplexed, front and rear side guides 104 and 106, pivot carriage 115 and pivot member 118 are fixedly connected to one another, while adjustment knob, 130, adjustment shaft 132, adjustment gear 140, upper pivot gear 142, lower pivot gear 144, tray adjustment shaft 146, tray adjustment gear 148 and motor support platform 158 may be eliminated, with motor 120 mounted directly to base 139.

Certain other advantageous elements may cooperate with the described arrangement. For example, to assure that the sheets are always fed from the tray along their centerline, which aids in the prevention of sheet skewing, the sheet feeder 97 may be mounted on pivot carriage 115, so that it moves in accordance with paper size. Other machine configurations are also well within the scope of the invention, including for example, as shown in FIG. 6, an arrangement in a reproduction machine 200 which locates a rotating tray 202 after output nip 204, such that the edge of the sheet which was leading on the path 206 from the processor into the duplex tray 202 remains, after rotation and refeeding with feeder 207, the same edge leading on the duplex path 208 out of the duplex tray, but with the sheet traveling in the opposite direction.

In accordance with another aspect of the invention, and as demonstrated in FIG. 7, the rotation of sheets in a duplex tray may be accomplished in a significantly simpler manner. As shown in FIG. 7, a tray for receiving first side copies is provided in the lower portion of the duplex capable reproduction machine. The tray in this case has closely similar ends, such that sheets may be fed out from the tray from either end thereof. Upon completion of the first side copy set, an operator may remove the tray, and rotate it manually in a single plane to convert the trail edge of the sheets to the leading edge, and reinsert the tray into position. Thus rotation of the tray pursuant to the invention is achieved, and book style duplex copying may be accomplished, for documents having images oriented parallel to the paper path. If pad style duplex copying is acceptable or desired, no rotation is performed. A similar arrangement may be used with respect to the embodiment of FIG. 6.

The invention has been described with reference to a preferred embodiment. Obviously modifications will occur to others upon reading and understanding the specification taken together with the drawings. It will no doubt be particularly appreciated that the many elements comprising the paper handling aspects of the present invention have applications beyond the described embodiment. This embodiment is but one example, and various alternatives modifications, variations or improvements may be made by those skilled in the art from this teaching which are intended to be encompassed by the following claims.

I claim:

1. In an imaging device suitable for making a duplex copy on a sheet, a method for making book style duplex copies from simplex documents having image information in a top to bottom alignment in the direction of sheet feeding, including the steps:

producing a number of sheets bearing first side image information in a first pass and directing said sheets along a duplex path to receive second side image information;

providing an odd number of sheet inversions as said sheets are directed along a duplex path;

stacking said sheets in a duplex tray;

rotating said duplex tray 180° while maintaining said duplex tray in a single plane, and passing said sheets out from said duplex tray to imprint a second side image information thereon such that the leading edge on the first pass remains the leading edge on a second pass.

2. The method as defined in claim 1 wherein the step of rotating the tray 180° includes manually removing the tray 180° from its position with respect to the duplex path, rotating the tray 180° while maintaining said duplex tray in a single plane, and returning the tray to its position with respect to the duplex path.

3. In an imaging device suitable for making a duplex copy on a sheet, said copies to be book style duplex from simplex documents having image information in a top to bottom alignment in the direction of sheet feeding, said device comprising:

a duplex sheet path for advancing sheets bearing first side image information from a first pass through a reproduction procesor to a duplex tray and back to said processor with an odd number of sheet inversions to receive image information on a second side thereof; and said duplex tray rotatable 180° in a single plane to orient said sheets for a second pass through said processor to receive second side image information, such that the leading edge on the first pass remains the leading edge on a second pass.

4. The reproduction machine as defined in claim 3 wherein said duplex tray is removable from a position with respect to said duplex path, and replaceable in either of rotated and unrotated conditions in said position.

5. In an device suitable for making a duplex copy on a sheet, each side of the sheet to be imprinted with image information having a top to bottom alignment oriented along the path of travel of said sheet, said device comprising:

a reproduction processor for imprinting image information onto either side of a sheet;

a duplex sheet path for advancing sheets bearing first side image information thereon from said reproduction processor to a duplex tray and back to said reproduction processor and providing an odd number of sheet inversions to return said sheets to said processor to receive image information on a second side thereof;

said duplex tray rotatable 180° about a pivot member in a single plane to orient said sheets to receive second side image information such that the leading edge on a first pass through said processor remains the leading edge on a second pass.

6. A device as defined in claim 5 including a rotating drive means, engaged to said duplex tray, for selectably drivingly said duplex tray in rotating movement.

7. An imaging device to selectively provide book style and pad style duplex copying, including a reproduction processor for imprinting images on either side of a sheet, a duplex paper path directing sheets bearing first side images from said reproduction processor to a duplex tray and back to said reproduction processor and providing an odd number of sheet inversions to return said sheets to said processor to receive images on a second side thereof said arrangement including:

carriage means for supporting said duplex tray for rotational movement;

a pivot forming an axis for rotation of said carriage means;

drive means for driving said carriage means in rotational movement about said pivot.

8. The device as defined in claim 7, wherein said drive means includes a motor drivingly engaged with a worm gear fixed to said carriage means.

9. The device as defined in claim 7, including:

means for adjusting the duplex tray to accommodate multiple sheet sizes; and means for adjusting the position of said pivot with respect to the duplex tray in accordance with sheet size, whereby said pivot is centered along the width of the sheet within the duplex paper path.

10. The device as defined in claim 9, wherein said means for adjusting said duplex tray to accommodate multiple sheet sizes includes side guide members parallel to the duplex paper path, one of which side guide members is adjustable with respect to the other; and said adjustable side guide member is coupled to said pivot means so that movement of said side guide member results in a corresponding scaled position adjustment of said pivot member.

11. In an imaging device suitable for making a duplex copy on a sheet, each side of the sheet to be imprinted with image information in top to bottom alignment oriented in the direction of sheet travel, a method for providing the copy with image information on each side of the sheet, said method comprising the steps:

producing a number of sheets bearing first side image information in a first pass through a reproduction processor, and directing said sheets along a duplex path including a duplex tray and an odd number of sheet inversions to receive second side image information in a second pass through said processor;

rotating said duplex tray 180° a first time in a single plane prior to receipt of sheets therein;

depositing said sheets in a duplex tray;

rotating said duplex tray 180° a second time, subsequent to receipt of sheets therein while maintaining said duplex tray in a single plane, such that the leading edge on a first pass remains the leading edge on the second pass through said processor;

passing said rotated sheets out from said duplex tray to imprint second side image information thereon.

12. In an imaging device suitable for making a duplex copy on a sheet, each side of the sheet to be imprinted with image information in top to bottom alignment oriented in the direction of sheet travel, a method for providing the copy with image information on each side of the sheet, said method comprising the steps:

producing a number of sheets bearing first side image information and directing said sheets to a duplex tray;

rotating said duplex tray 180°;

providing said sheets with an odd number of sheet inversions to return the sheets to receive second side image information.

* * * * *